US008838599B2

(12) United States Patent
Xu et al.

(10) Patent No.: US 8,838,599 B2
(45) Date of Patent: Sep. 16, 2014

(54) EFFICIENT LEXICAL TRENDING TOPIC DETECTION OVER STREAMS OF DATA USING A MODIFIED SEQUITUR ALGORITHM

(75) Inventors: Zhichen Xu, San Jose, CA (US); Yun Fu, Sunnyvale, CA (US); Neal Sample, Santa Cruz, CA (US)

(73) Assignee: Yahoo! Inc., Sunnyvale, CA (US)

( * ) Notice: Subject to any disclaimer, the term of this patent is extended or adjusted under 35 U.S.C. 154(b) by 551 days.

(21) Appl. No.: 12/780,850

(22) Filed: May 14, 2010

(65) Prior Publication Data
US 2011/0282874 A1  Nov. 17, 2011

(51) Int. Cl.
*G06F 17/30* (2006.01)
(52) U.S. Cl.
CPC ............................. *G06F 17/30616* (2013.01)
USPC ............ 707/737; 707/748; 707/752; 707/769
(58) Field of Classification Search
USPC ........... 707/737, 736, 748, 752, 769, E17.044
See application file for complete search history.

(56) References Cited

U.S. PATENT DOCUMENTS

| 6,327,699 | B1 * | 12/2001 | Larus et al. .................... 717/128 |
| 7,752,204 | B2 * | 7/2010 | Kao et al. ....................... 707/736 |
| 2001/0021938 | A1 * | 9/2001 | Fein et al. ...................... 707/531 |
| 2002/0042793 | A1 * | 4/2002 | Choi ................................. 707/6 |
| 2002/0073405 | A1 * | 6/2002 | Chilimbi ....................... 717/151 |
| 2002/0162108 | A1 * | 10/2002 | Lin-Hendel ..................... 725/52 |
| 2004/0225667 | A1 * | 11/2004 | Hu et al. ........................ 707/100 |
| 2007/0100875 | A1 * | 5/2007 | Chi et al. ....................... 707/102 |
| 2007/0198459 | A1 * | 8/2007 | Boone et al. ...................... 707/1 |
| 2010/0157354 | A1 * | 6/2010 | Darwish ....................... 358/1.15 |

OTHER PUBLICATIONS

Nevill-Manning, C. G. et al., "Identifying Hierarchical Structure in Sequences: A linear-time algorithm," Journal of Artificial Intelligence Research 7, 1997, pp. 67-82.
http://en.wikipedia.org/w.index.php?title=Part-of-speech_tagging&printable=yes, Part-of-speech Tagging, Wikipedia, last modified Mar. 26, 2010 (accessed Apr. 23, 2010), 5 pages.
http://en.wikipedia.org/w.index.php?title=Bigram&printable=yes, Bigram, Wikipedia, last modified Apr. 3, 2010 (accessed Apr. 21, 2010), 2 pages.
http://en.wikipedia.org/w.index.php?title=Sequitur_algorithm&printable=yes, Sequitur Algorithm, Wikipedia, last modified Mar. 3, 2010 (accessed Apr. 14, 2010), 1 page.

* cited by examiner

*Primary Examiner* — Shiow-Jy Fan
(74) *Attorney, Agent, or Firm* — Martine Penilla Group, LLP

(57) ABSTRACT

Embodiments are directed towards a Modified Sequitur algorithm (MSA) using pipelining and indexed arrays to identify trending topics within a plurality of documents having user generated content (UGC). The documents are parallelized and distributed across a plurality of network devices, which place at least some of the received documents into a buffer for which the MSA may then be applied to the documents within the buffer to identify n-grams or phrases within the documents' contents. The identified phrases are further analyzed to remove extraneous co-occurrences of phrases, and/or words based on a part of speech analysis. A weighting of the remaining phrases is used to identify trending topic phrases. Links to content in the plurality of UGC documents that is associated with the trending topic phrases may then be displayed to a client device.

19 Claims, 8 Drawing Sheets

As each new input symbol is observed, append it to rule S
Each time a link is made between two symbols
  If the new digram is repeated elsewhere and the repetitions do not overlap
    If the other occurrence is a complete rule
      replace the new digram with the new terminal-symbol that heads the rule
    otherwise
      form a new rule and replace both digrams with the new non- terminal
  otherwise insert the digram into the index Each time a digram is replaced by a non-terminal symbol
    if either symbol is a non-terminal that only occur once elsewhere
      remove the rule, substituting its contents in place of the other non-terminal

EFFICIENT LEXICAL TRENDING TOPIC DETECTION OVER STREAMS OF DATA USING A MODIFIED SEQUITUR ALGORITHM

TECHNICAL FIELD

The present invention relates generally to phrase detection and, more particularly, but not exclusively to employing a modified sequitur algorithm using pipelining and indexed arrays to detect trending topics within a plurality of user generated content (UGC).

BACKGROUND

Today, online social networks have become the new meeting grounds. The development of such online social networks touch countless aspects of our everyday lives; providing instant access to people of similar mindsets, and enabling us to form partnerships with more people in more ways than ever before. They also enable people to stay informed on things that may be relevant to their friends, family, their career, their community, and the world.

One aspect of our everyday lives that may be affected by online social networking technology is the ease in which stories, life experiences, opinions, and the like, may be shared or otherwise distributed over the internet. One mechanism that has made such opportunities possible is known as the web log or blog site.

Blogs are typically web sites whose content are maintained by individuals and include entries of commentary, events, opinions, graphics, videos, and the like, on a variety of topics. Some of these topics might include stories, events, or the like, about an individual, their family, people and/or events in the news, or so forth. Typically, the information provided by an author of such blogs is referred to as User Generated Content (UGC), because, unlike many professional websites, or other sources, such content is considered to be user generated.

People that seek out such sites may do so to be informed and to be kept current on what is relevant to their friends, and/or society. Many people seek to learn what are often called the hot or trending topics being discussed on the Internet. However, because there are so many different blogs, professional websites, and other network sources of information, it is often very difficult to determine what the trending topics are. This is especially true because such topics may change over time. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 4 illustrates a logical flow generally showing one embodiment of an overview process for use in implementing the Sequitur Algorithm;

DETAILED DESCRIPTION

Figure 1:
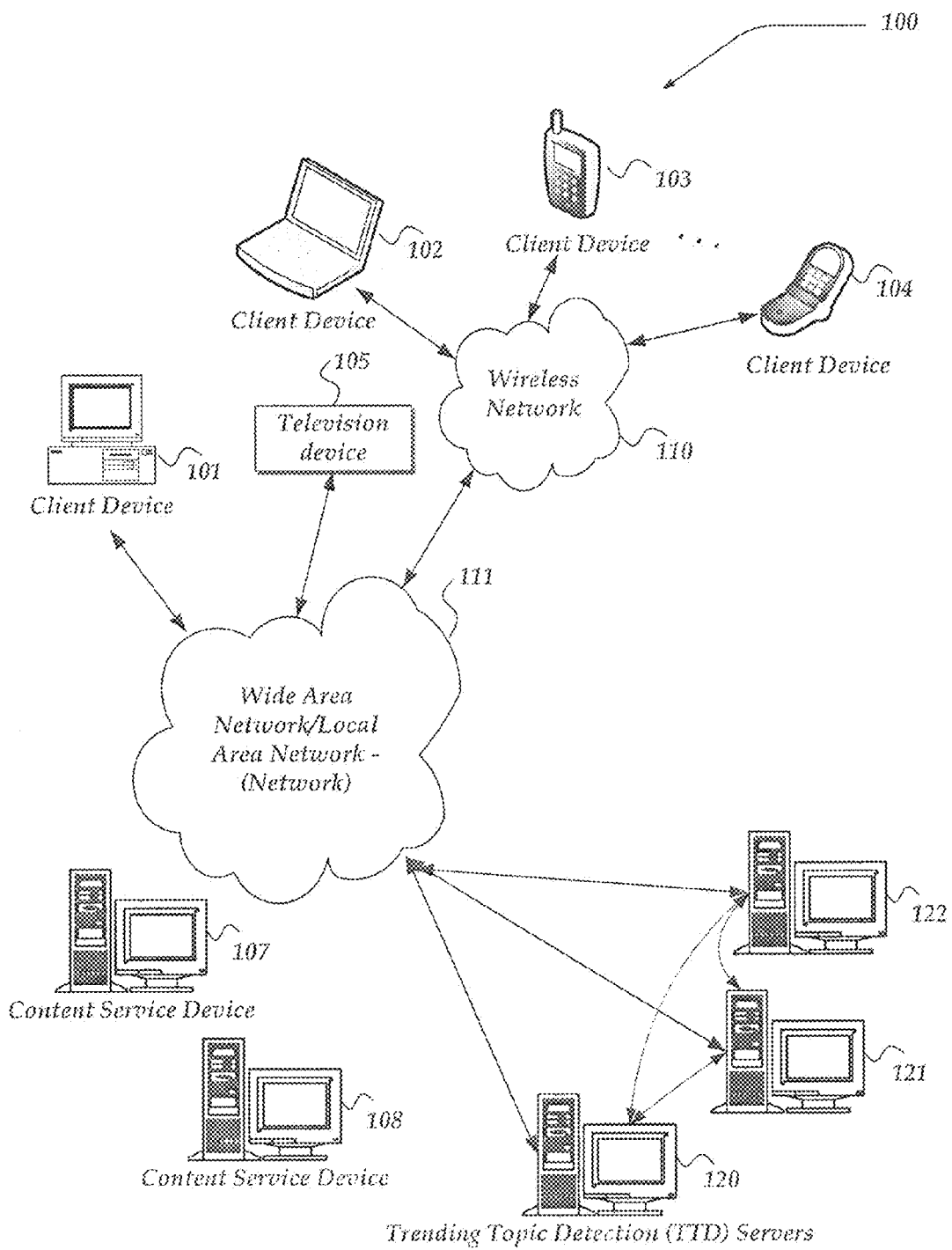
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "User Generated Content" or UGC refers to any form of content generated by users rather than professional services, such as newspapers, broadcasting services such as television, or the like. Such UGC is herein referred to as UGC documents, but is intended to include messages, webpages, and/or virtually any other form or format useable by a user to generate and/or distribute the user generated content to be read or shared with another user. Typically, such UGC may be posted on a website, within a user managed blog, a photo website, or the like. However, as noted, such UGC documents include messages, such as email messages, instant messages, or the like.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards employing a Modified Sequitur Algorithm (MSA) using pipe-lining and indexed arrays to identify trending topics within a plurality of user generated content (UGC) documents. The plurality of documents includes, but is not limited to web pages, messages, including message threads, and the like. Such UGC is not to be construed as being limited by a particular form or format in which the content may be received. Moreover, it should be noted that the UGC may be in any of a variety of human languages, and therefore is not constrained to a particular language. For example, Chinese, Greek, Thai, Japanese, and/or virtually any written language may be included in the UGC.

As the plurality of UGC documents are received for a given time window, they may be examined based on a parallelization scheme for use in distributing the documents across a plurality of network devices. For example, in one embodiment, a similarity analysis may be used to distribute the documents so as to provide as much dissimilarity in content within a given group of documents for a given network device. In one embodiment, the distribution may be based on measuring a distance to a centroid to each of the document clusters. However, as discussed further below, other parallelization schemes may also be used. Once distributed for a given time window, each of the plurality of network devices may place at least some of the received documents into a buffer. The MSA may then be applied to the documents within the buffer to identify n-grams or phrases within the documents' contents. In one embodiment, an indexed array is used to manage the identified phrases. In one embodiment, a state machine approach may be used to chain the identified rules for the identified phrases. Documents in the buffer may be replaced with other received documents based on various criteria, including a statistical analysis, or the like. The identified phrases or n-grams from each of the plurality of network devices may be merged for further analysis, including removal of extraneous co-occurrences of phrases, removal of phrases, words, or the like, based on a part of speech analysis, or the like. A weighting may be applied to the remaining phrases within the current time window to identify a possible candidate set of phrases. In one embodiment, a phrase may be identified as a trending topic if the phrase appears more frequently in a window of consideration, such as a current time window, than in other time windows that enclose or otherwise includes the window of consideration. Of the identified trending topic phrases, redundancies of phrases may be removed. The plurality of UGC documents may then be searched to generate links to the documents having content associated with the trending topic phrases. Such information may then be displayed in any of a variety of forms.

It should be recognized that while the disclosure is described in terms of UGC documents, the invention is not so limited. Thus, in other embodiments, other documents, content, and the like, may also be used, including, for example, content from professional sources, such as news sources, educational sources, financial sources, advertisement sources, or the like. Moreover, various embodiments may also receive a combination of UGC documents and non-UGC documents, without departing from the scope of the invention.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 111, wireless network 110, client devices 101-105, content service devices 107-108, and Trending Topic Detection (TTD) servers 120-122.

One embodiment of client devices 101-105 is described in more detail below in conjunction with FIG. 2. Generally, however, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including social networking information, performing various online activities, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network. Client device 105 may include virtually any device useable as a television device. Today, many of these devices include a capability to access and/or otherwise communicate over a network such as network 111 and/or even wireless network 110. Moreover, client device 105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Client devices 101-105 also may include at least one other client application that is configured to receive and/or send content, including UGC, between another computing device. The client application may include a capability to provide and receive textual content, graphical content, audio content, and the like. The client application may further provide information that identifies itself, including a type, capability, name, and the like. In one embodiment, client devices 101-105 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent between other client devices, content service devices 107-108, TTD servers 120-122, or other computing devices.

Client devices 101-105 may further be configured to include a client application that enables an end-user to log into an end-user account that may be managed by another computing device, such as content service devices 107-108, TTD servers 120-122, or the like. Such end-user account, for example, may be configured to enable the end-user to manage one or more online activities, including for example, search activities, social networking activities, browse various websites, make purchases, sell products/services, communicate with other users, or share attachments with others, or the like. However, participation in such online networking activities may also be performed without logging into the end-user account.

Moreover, client devices 101-105 may be configured to operate to send messages, and other UGC documents for posting through and/or on a content service device, such as 107-108. That is, in one embodiment, a user of client devices 101-105 may select to create and/or otherwise post UGC documents within a blog, webpage, or the like, hosted by one or more of content service devices 107-108.

Wireless network 110 is configured to couple client devices 102-104 and its components with network 111. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 111 is configured to couple network devices with other computing devices, including, content service devices 107-108, TTD servers 120-122, client devices 101 and 105, and through wireless network 110 to client devices 102-104.

Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Content service devices 107-108 include virtually any network device usable to operate as website servers to provide content to client devices 101-105. Such content may include, but is not limited to webpage content, advertisements, professionally generated content (non-UGC content), search results, blogs, photograph sharing pages, and/or any of a variety of User Generated Content for access by another client device. Content service devices 107-108 may also operate as a messaging server such as an SMS message service, IM message service, email message service, alert service, or the like. Moreover, content service devices 107-108 may also operate as a File Transfer Protocol (FTP) server, a database server, music and/or video download server, or the like. Additionally, content service devices 107-108 may be configured to perform multiple functions.

Content service devices 107-108 may also be configured to receive messages, and/or any of a variety of other UGC documents that may then be used to identify hot or trending topics. Content service devices 107-108 may, in one embodiment, provide at least access to, and/or a copy of the received messages and other UGC documents to one or more of TTD servers 120-122 for identification of trending topics for one or more time windows. The time windows may be virtually any period of time. However, typical time windows might include, but are not limited to, a current time window—such as an hour, a past thirty minutes, a day, week, month, year, or the like. Content service devices 107-108 may also receive links from TTD servers 120-122 to one or more of the UGC documents having content determined to be associated with the identified trending topics. Content service devices 107-108 may then display for access by client devices 101-105 the identified trending topics for selected time windows, along with links associated UGC documents.

It is recognized that due to various privacy concerns at least some of the received UGC documents might either not be examined, and/or not have links to them based on the trend analysis. Thus, in one embodiment, an opt-out, an opt-in, or similar policy might be provided that enables various users to select whether to participate in having their content associated with the links, analysis, or related activities.

One embodiment of TTD servers 120-122 is described in more detail below in conjunction with FIG. 3. Briefly, however, TTD servers 120-122 may include any computing device capable of connecting to network 111 to receive a plurality of UGC documents useable to identify trending topics within the documents. In one embodiment, the documents may be received by a single one of TTD servers 120-122, which may then distribute the documents across the other TTD servers 120-122 for processing. However, other configurations may also be employed.

In one embodiment, the documents may be distributed across the other TTD servers 120-122 using any of a variety of parallelization strategies. For example, the documents may be partitioned into groups of documents and distributed based on maximizing a dissimilarity of the content within the documents for a given group. Other parallelization strategies may also be used. In any event, each of the TTD servers 120-122 may then perform a Modified Sequitur Algorithm (MSA) on the received documents using pipelining, and indexed arrays, to identify phrases as candidate trending topics phrases. In one embodiment, frequent phrases or rules may be encoded as state machines that then enable chaining of the rules through a sequence of symbols. Once the received documents have been analyzed, the identified phrases from each of the TTD servers 120-122 may be merged for further analysis, including, removing extraneous co-occurrences of phrases, removing words based on a part of speech analysis, and the like. Then for each identified phrase for a current time window, its frequency may be determined, and its frequency in a plurality of other time windows. A weighting for the phrases may then be used to identify a reduced set of candidate phrases. For example, in one embodiment, a plurality of time windows of different sizes may be generated. A phrase is then identified from the candidate phrases as a trending topic if the phrase appears more frequently in a time window of consideration than in the other enclosing windows (a window of time that surrounds or otherwise includes the time window of consideration). Other windowing approaches may also be employed other than a nested time window approach. For example, in another embodiment, consecutive windows, for example that tie to derivatives or other measures to detect whether a phrase is trending may also be employed, without departing from the scope of the invention.

Links may then be generated to one or more UGC documents associated with the trending topic phrases. The trending topic phrases and links may then be provided to content service devices 107-108 for display to client devices 101-105, or the like. In another embodiment, TTD servers 120-1022 may display the links and trending topic phrases. TTD servers 120-122 may employ processes such as described in more detail below in conjunction with FIGS. 6-7 to perform at least some of their actions.

Devices that may operate as content servers 107-18 and/or TTD servers 120-122 include various network devices, including, but not limited to personal computers, desktop computers, multiprocessor systems, microprocessor-based or programmable consumer electronics, network PCs, server devices, network appliances, and the like. It should be noted that while TTD servers 120-122 illustrate a plurality of network devices useable to identify trending topics, distinct from displaying such results, the invention is not so limited. Thus, in one embodiment, one or more functions of content service devices 107-108, may also be performed by TTD servers 120-122.

Moreover, TTD servers 120-122 are not limited to a particular configuration. Thus, in one embodiment, TTD servers 120-122 may operate using a master/slave approach, where one of TTD servers 120-122 operates to manage and/or otherwise coordinate operations of the other network devices. In other embodiments, the TTD servers 120-122 may operate within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
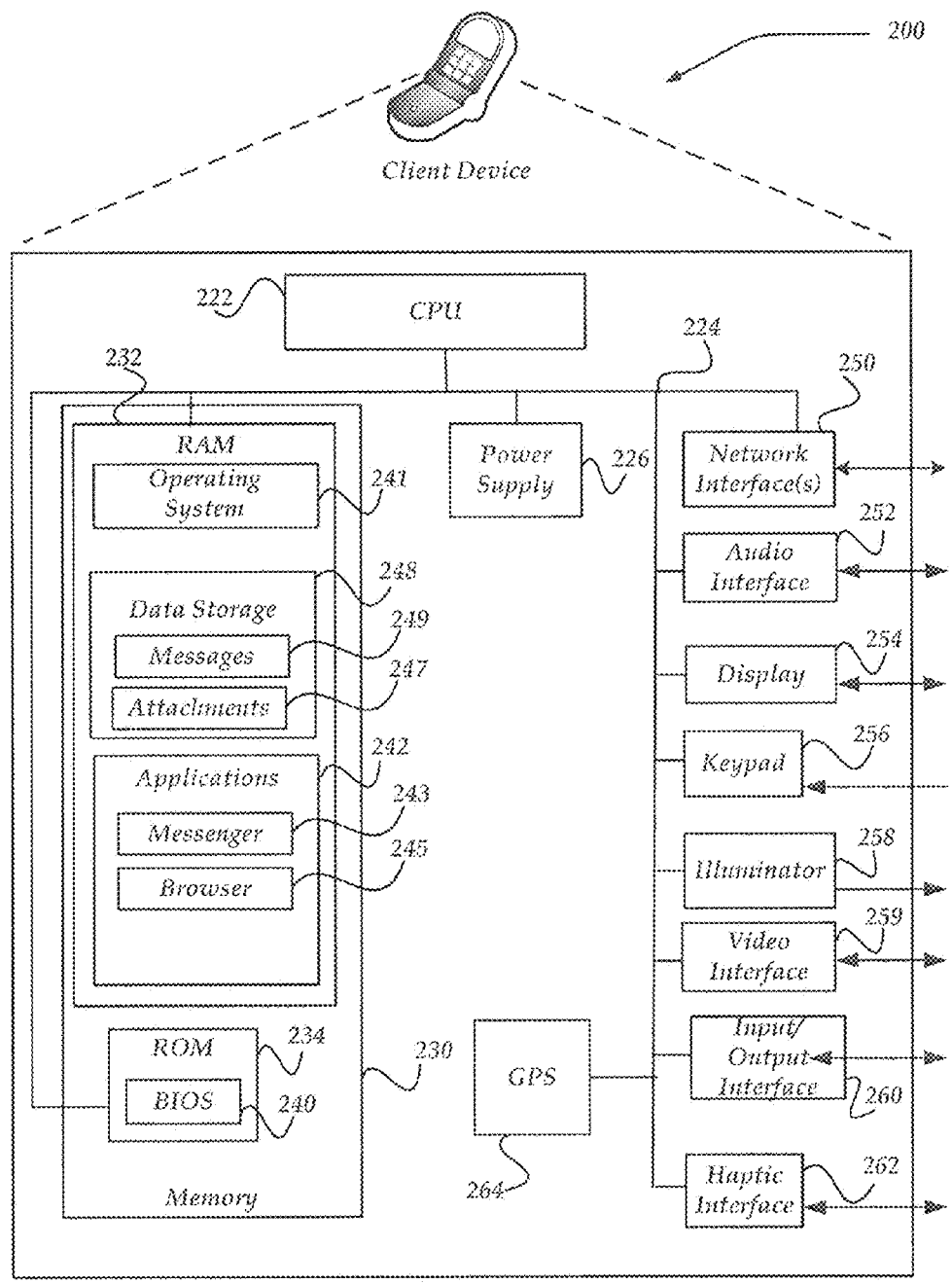
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-105 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed; such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates an example of computer readable storage media (devices) for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200. The information may then be provided to another device based on any of a variety of events, including being sent as part of a header during a communication, sent upon request, or the like. Data storage 248 may also be employed to store social networking information including address books, buddy lists, aliases, user profile information, or the like. Further, as illustrated, data storage 248 may also store messages, web page content, or any of a variety of user generated content. At least a portion of the information may also be stored on a disk drive or other computer-readable storage device (not shown) within client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Applications 242 may include, for example, messenger 243 and browser 245.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may be employed. In one embodiment, browser 245 may enable a user of client device 200 to provide and/or receive user generated content including messages and/or other documents between another computing device for posting, reading, and/or otherwise communicating with another client device.

Messenger 243 may be configured to manage a messaging session using any of a variety of messaging communications including, but not limited to email, Short Message Service (SMS), Instant Message (IM), Multimedia Message Service (MMS), internet relay chat (IRC), mIRC, RSS feeds, and/or the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols, including, but not limited to various push and/or pull mechanisms for client device 200. In one embodiment, messenger 243 may interact with browser 245 for managing messages. As used herein, the term "message" refers to any of a variety of messaging formats, or communications forms, including but not limited to email, SMS, IM, MMS, IRC, or the like.

Illustrative Network Device

Figure 3:
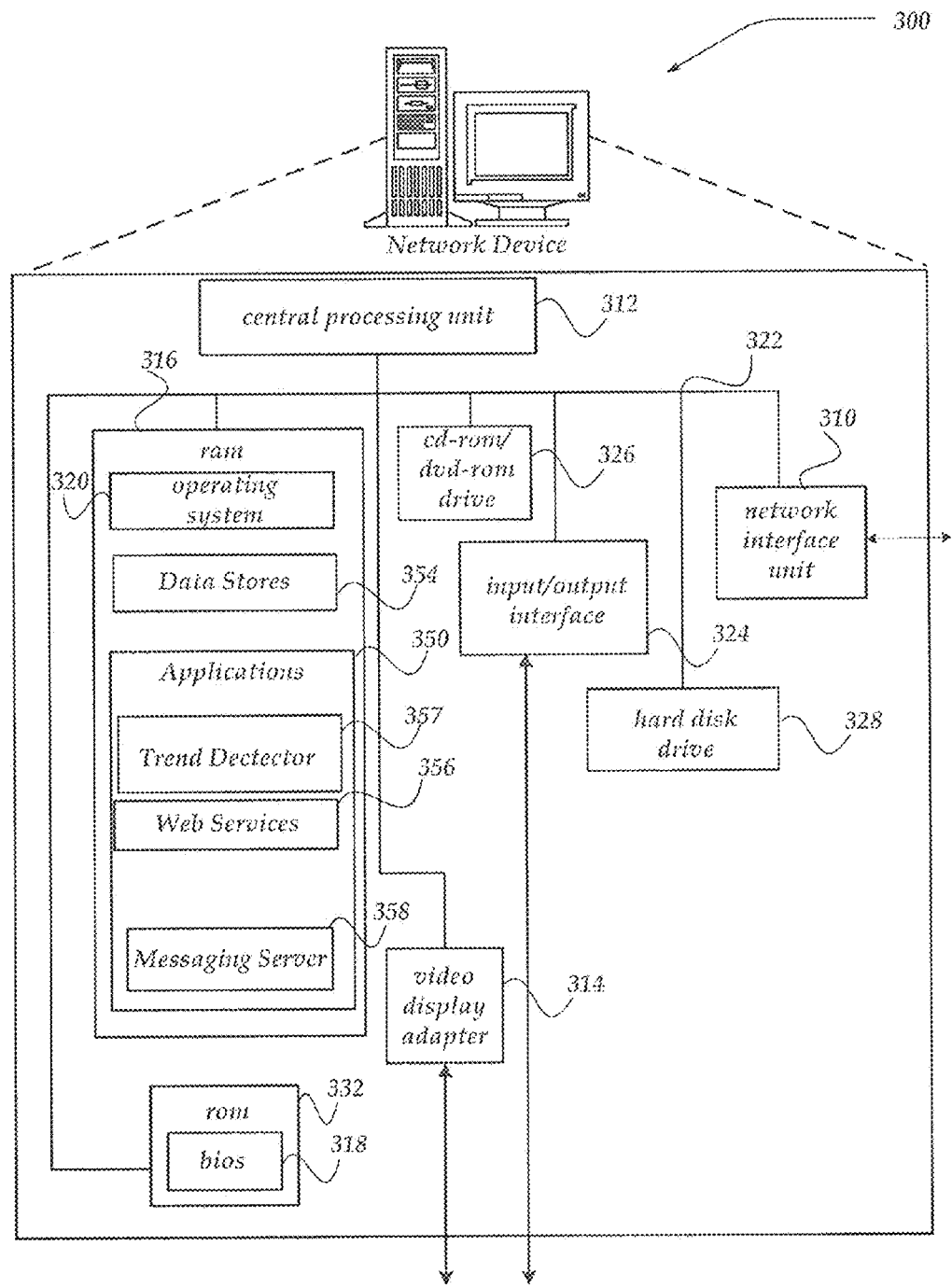
FIG. 3 shows one embodiment of a network device that may be included in a system implementing the invention.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, one of TTD servers 120-122 of FIG. 1. As described below, network device 300 may further include a capability to manage display of identified trending topics with links to UGC documents. However, as noted above, the invention is not so limited, and identifying the trending topics may be performed on a different network device than one that enables a display or other access to the trending topics.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 354 may include a database, text, spreadsheet, folder, file, or the like, that may be configured to maintain and store user account identifiers, user profiles, email addresses, IM addresses, and/or other network addresses; or the like. Data stores 354 may also store various messages, UGC documents, and the like. In one embodiment, storage of such information may be based on a specific user, user account, profile, or the like. Data stores 354 may further include program code, data, algorithms, and the like, for use by a processor, such as central processing unit (CPU) 312 to execute and perform actions. In one embodiment, at least some of data store 354 might also be stored on another component of network device 300, including, but not limited to cd-rom/dvd-rom 326, hard disk drive 328, or the like.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Web services 356, messaging server 358, and Trend Detector 357, may also be included as application programs within applications 350.

Web services 356 represent any of a variety of services that are configured to provide content, including messages, over a network to another computing device. Thus, web services 356 include for example, a web server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like.

In one embodiment, Web services 356 may receive UGC documents from another network device, such as a client device, or the like. Web services 356 may then enable a user to prepare and/or otherwise manage the UGC documents for access by various other users. As such, web services 356 may allow users to manage blog pages of UGC documents, or the like. However, web services 356 are not limited to blogs, and other web pages may be used for posting of UGC documents.

Messaging server 358 may include virtually any computing component or components configured and arranged to forward messages from message user agents, and/or other message servers, or to deliver messages to a local message store, such as data store 354, or the like. Thus, messaging server 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. Messaging server 358 may also be managed by one or more components of messaging server 358. Thus, messaging server 358 may also be configured to manage SMS messages, IM, MMS, IRC, RSS feeds, mIRC, or any of a variety of other message types. In one embodiment, messaging server 358 may enable users to initiate and/or otherwise conduct chat sessions, VOIP sessions, or the like. As noted elsewhere, messages are also considered as one type of UGC documents.

Additionally, web services 356 and messaging server 358 may receive a plurality of UGC documents for a given time period, and provide the received UGC documents to Trend Detector 357 for use in identifying trending topics from the content of the documents.

Trend Detector 357 is configured to receive the plurality of UGC documents and to identify trending topics within the documents. In one embodiment, because of the nature of sharing UGC documents, such documents may be considered as being received in a continuous stream of documents. Thus, in one embodiment, the documents may be considered as being associated with at least one time window—the time window for which the documents are received at the Trend Detector 357, or some other device, component, or the like. That is, in one embodiment, the received documents in a continuous stream of documents may be tagged or otherwise identified when they are received.

In one embodiment, the documents may be received by a single one of Trend Detector 357, which may then distribute the documents across the other network devices similar to network device 300 having similar trend detectors 357, such that the distributed documents may be operated on substantially in parallel to identify trending topics.

In one embodiment, trend detector 357 may distribute the plurality of UGC documents using any of a variety of parallelization strategies. For example, in one embodiment, trend detector 357 may select to distribute documents such that each of the plurality of other network devices has a group of documents having a determined maximum likelihood of dissimilar content across the documents. However, other strategies may also be used, including, measuring a distance to a centroid to each of the documents to cluster the documents; using an entropy measurement to determine how to cluster the documents; or even grouping the documents based on a time the document is received.

Once the documents are distributed each trend detector 357 in the plurality of network devices may perform the Modified Sequitur Algorithm (MSA) on the received documents using pipelining, and indexed arrays to identify phrases as candidate trending topics phrases. From the phrases identified by the MSAs, a reduction on the phrases may be performed to remove extraneous co-occurrences of phrases, selected words based on a part of speech analysis, and the like. In one embodiment, a single trend detector 357 may receive the plurality of phrases from each of the other network devices, or each trend detector 357 may perform the further reduction of phrases.

The phrases from each of the network devices may be combined and further analyzed. For one embodiment, for each phrase identified in a current time window, frequency information may be obtained and used to generate weighting values. The weighted values may then be used to identify candidate phrases.

In one embodiment, time windows of different sizes may be used to determine whether a candidate phrase has a higher frequency of occurrence in the window of consideration than in other enclosing windows. The result of this analysis may then be a set of trending topic phrases. Trending Detector 357 may further reduce this set by removing redundant phrases, or the like.

Trending Detector 357 may then perform an analysis over the plurality of UGC documents to generate links to documents having content associated with the identified trending topic phrases. Trending Detector 357 may employ a process such as is described below in conjunction with FIGS. 6-7 to perform at least some of its actions.

Generalized Operation

The operation of certain aspects of the invention will now be described with respect to FIGS. 4-6. FIG. 4 illustrates a logical flow generally showing one embodiment of an overview process for use in implementing the Sequitur Algorithm. It should be noted however, that other variations may also be employed. In any event, the algorithm, at least in principle, is directed towards inducing a context-free grammar from a sequence of symbols. It may repeatedly append symbols from an original content into a rule. The original algorithm was introduced for identifying hierarchical structure in content, and has been used predominantly for compression techniques. However, use of the Sequitur Algorithm, in a modified form, provides an unexpected and previously unknown use in the field of phrase identification.

Figure 5:
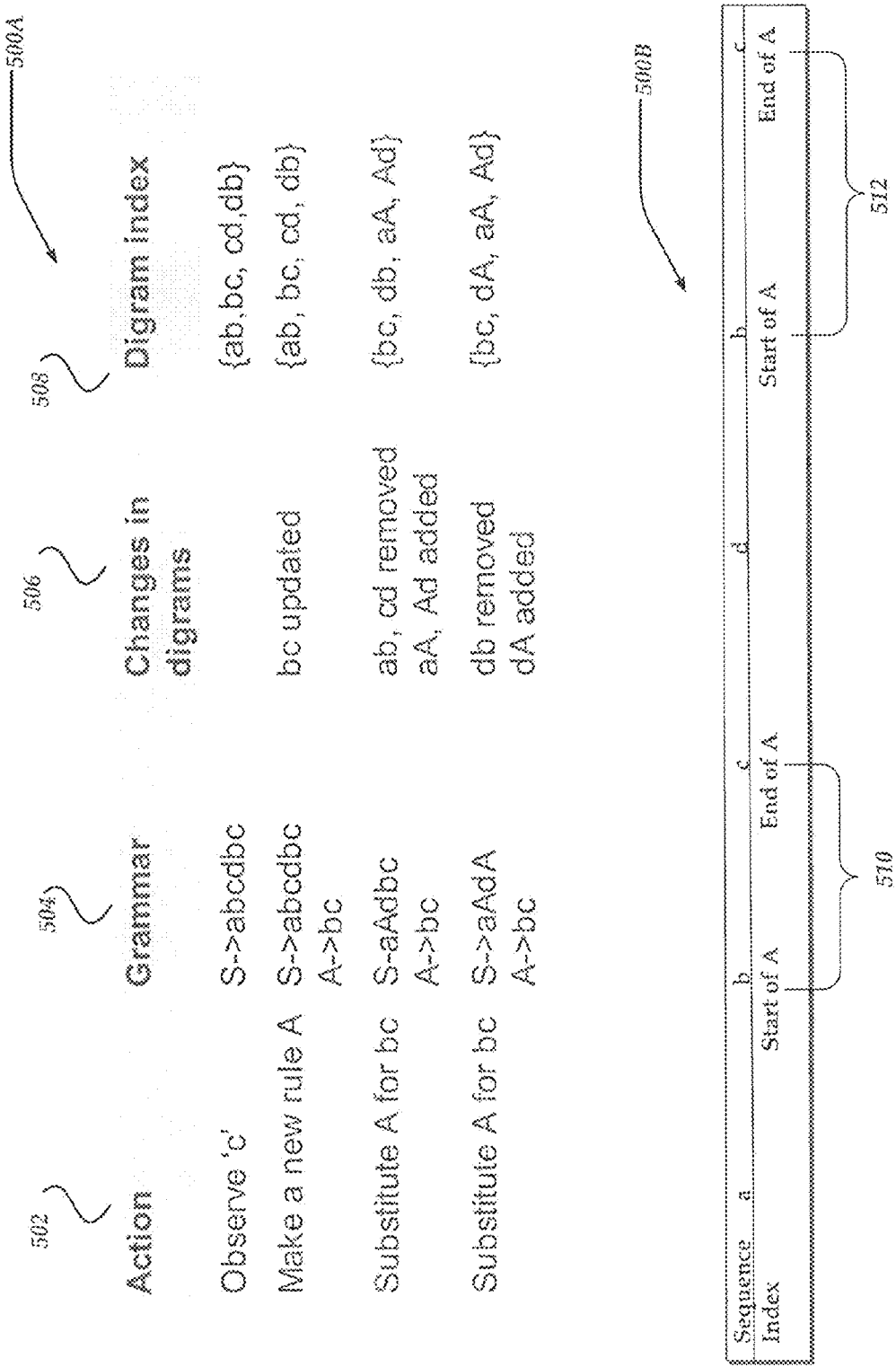
FIG. 5 illustrates non-limiting, non-exhaustive examples of employing the Sequitur Algorithm for identifying n-grams, and further employing an indexed array structure.

FIG. 5 illustrates non-limiting, non-exhaustive examples of employing the Sequitur Algorithm for identifying n-grams or phrases, and further employing an indexed array structure. As shown, table 500A includes action column 502 which illustrates an action, grammar 504 shows generated grammar rules identified as the algorithm progresses; changes in digrams 506 illustrate the changes generated for a given sequence of characters; and digram index 508 illustrates the indices which are the data structure employed for the algorithm. In this example, a sequence of two characters is being considered. However, other length sequences may also be considered. Thus, the algorithm may be used for n-grams.

The sample sequence of characters being evaluated may represent some sequence of characters in the received plurality of documents. It is noted that the sequence example is shortened so as to describe the operations of the algorithm. Clearly other lengths of documents are typically employed. Here, the sequence is:

a b c d b c

As can be observed, when the last 'c' is observed by the algorithm, 'bc' is recognized as a new digram. This is due to the linkage between the two last symbols "b" and "c." "bc" is already in the digram index. As a result a new rule A is created and both occurrences of 'bc' are replaced by a non-terminal rule A. The digram index may then be updated accordingly in each step as shown in digram index 508.

However, while the original Sequitur Algorithm may provide an elegant solution to compression problems, it has several limitations when attempted to be applied to the problem of phrase identification. For example, as may be seen, the doubly linked list structure shown in table 500A may not be very memory efficient, especially for international languages such as Chinese, or the like. Moreover, the original Sequitur Algorithm assumes all the content is already available. However, that is often not the case for UGC documents. Thus, the original Sequitur Algorithm does not appear to be designed to handle data streams, which is how the plurality of UGC documents may be received when considered over time. Therefore, several modifications have been made in the implementation of the Sequitur Algorithm to address at least these problems.

For example, an array is employed to represent the text, as opposed to a double-linked list. Moreover, instead of physically replacing the digrams with non-terminal rules, the digrams are marked by introducing an indexed array structure to indicate which position in the original sequence of characters is a start or an end of a non-terminal rule. By doing this, the contexts of all non-terminal instances may be readily managed. Indexed array 500B shows one non-limiting example of an index structure useable to mark a beginning or end of non-terminals, such as non-terminals 510 and 512.

Further modifications include encoding frequent phrases or rules as "state machines." To encode rules as state machines, the rules are chained through a sequence of symbols. For example, if rule A is created for the sequence 'bc' and the rule B is created for 'bcxy', then the rule chain generated may be:

A→[xy]→B

This means that if a pattern is recognized as rule A, the Modified Sequitur Algorithm continues to observe the sequence 'xy' then the entire sequence is recognized as rule B. This avoids repeated look ups of all the prefixes of long phrases. It is believed that such modifications can reduce the memory footprint of the original algorithm and further provide faster execution times.

To provide another example, consider the sequence:

```
a    b    c    d    b    c    d    f
C <----a----A---d--->B----f---->
```

Then the MSA continuously scans the text sequence, and if the process recognized non-terminal 'A' and observe the symbol "d", then Ad is replaced with B until the process is unable to walk the rule chains. That is, the chain A→[d]→B is constructed when Ad is recognized as a non-terminal B. This is directed towards avoiding repeated digram index lookups.

Figure 6:
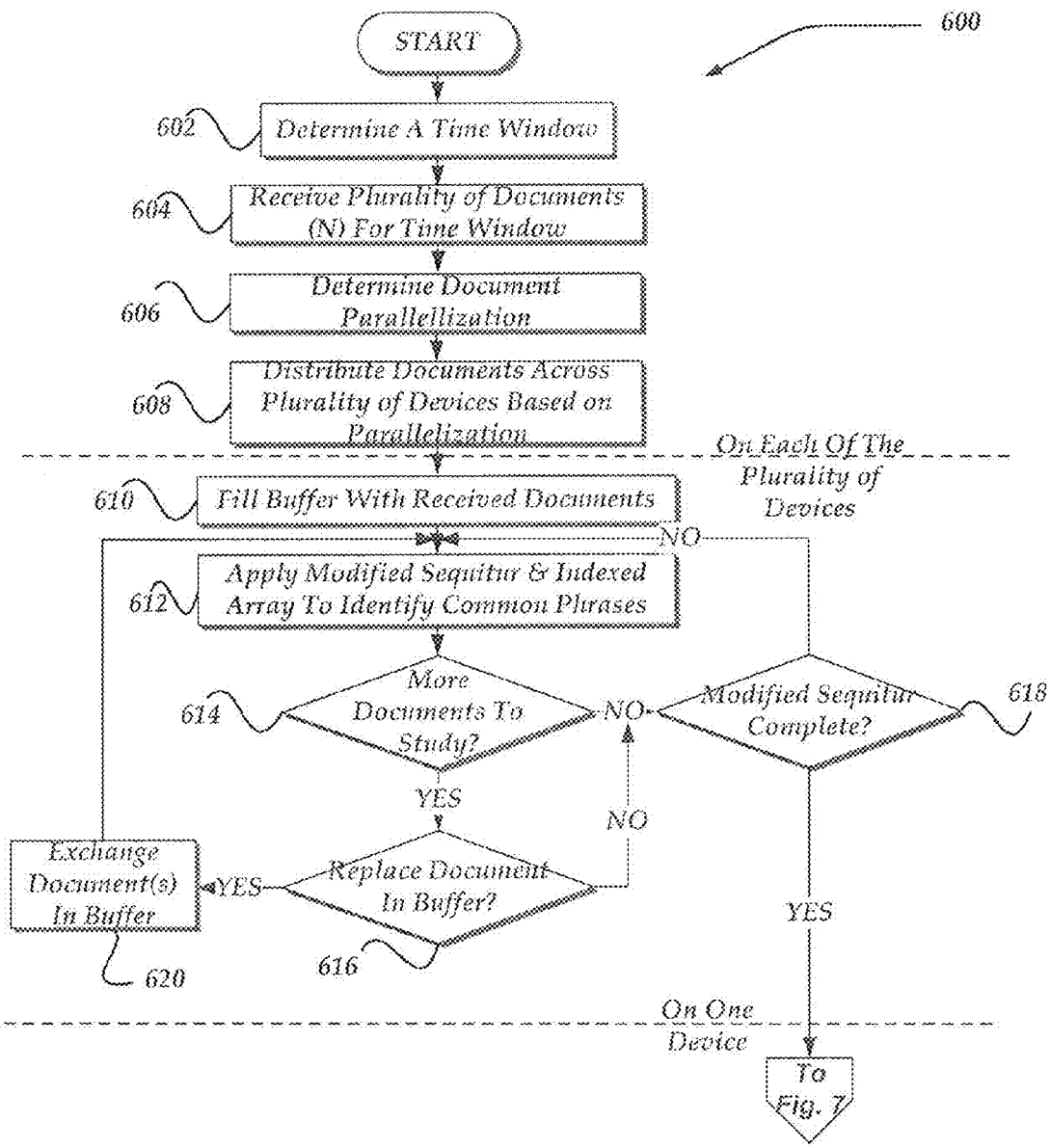
FIGS. 6-7 illustrate logical flow diagrams generally showing one embodiment of an overview process for selecting keywords from the relevant sentences.
Figure 7:
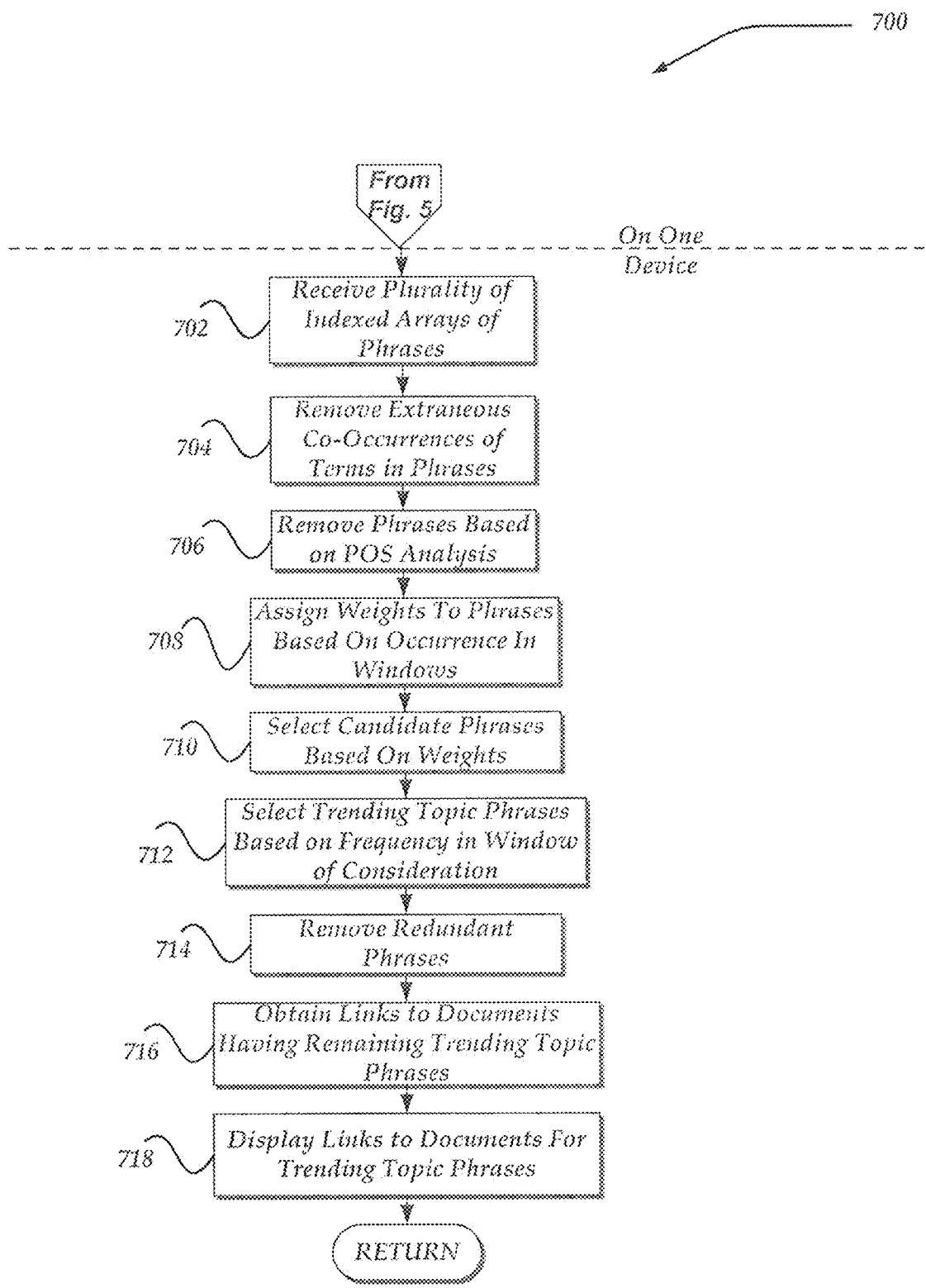

FIGS. 6-7 illustrate a logical flow diagram generally showing one embodiment of an overview process for selecting keywords from the relevant sentences. Processes 600-700 may be performed within a single network device, such as network device 300 of FIG. 3, or portions of processes 600-700 may be distributed across a plurality of network devices to enable parallelization of UGC document streams. Handling data streams of UGC documents may be a particular concern as users do not typically generate content at a particular time or merely once. Thus, handling of data that may arrive continuously is relevant. To address this problem, a pipeline architecture is introduced as described below.

Process 600 begins, after a start block, at block 602, where a current time window is determined. Such time window may be a current hour, for example. However, other current time windows are also possible.

Flowing next to block 604, for the current time window, a plurality of UGC documents are received. In one embodiment, the documents may be received in a continuous flow from a variety of sources, including, for example, various messaging servers, web services, or the like. Continuing next to block 606, a document parallelization strategy is determined for at least a received portion of the continuous flow of documents. As noted, elsewhere documents may be distributed across a plurality of network devices, each having a Modified Sequitur Algorithm thereon for use in identifying phrases.

Various approaches may be used for partitioning the received plurality of documents across the plurality of network devices. For example, in one embodiment, the documents may be analyzed to group dissimilar documents onto a same network device. Dissimilarity may be based on content, document type, or the like. In one embodiment, the content may be analyzed using various mechanisms, such as similarity cosine algorithms, or the like. Then similar documents may be grouped across different network devices in a manner that seeks to create groups of documents having a greatest reasonable difference in content between the group's documents. However, other parallelization strategies might include measuring a distance to a centroid to each document cluster to determine dissimilarities. A measure of entropy might also be used to partition the plurality of documents. In still another embodiment, the documents may be grouped based on when they are received within the time window. In any event, the groupings of the plurality of documents may then be used at block 608 to distribute the documents across the plurality of network devices.

The following steps may be performed on each of the plurality of network devices, for their respective group of documents. At block 610, each network device may employ a pipelining approach to further manage the stream of documents from the plurality of documents.

With the Modified Sequitur Algorithm, for a phrase to be identified, the phrase should appear at least twice, and the phrase should appear in different contexts for it to be recognized. In practice, however, it may be impossible to buffer all of the UGC documents before performing the Sequitur Algorithm as stated above, because the UGC documents typically are received in a continuous data stream. Moreover, the UGC documents received may be of widely varying sizes. To address this problem, each of the network devices may employ a document buffer such that a subset of the received documents may be processed in a pseudo batch approach.

The process can be streamlined by incrementally adding and/or removing documents into and from the buffer. A document may be removed from the buffer after a determined amount of the phrases have been identified. In one embodiment, whether a document is ready to be removed from the buffer may be based on various statistical information, such as a number of identified phrases per some number of characters. In one embodiment, the number of phrases might be based on a ratio of phrases to characters. For example, 2-10 phrases per 100 characters, or the like. Clearly, other ratios, and/or values may also be used, based on trading off efficiency of the MSA with size of a buffer, and number of documents to be evaluated within a given time window. In principle, the larger the buffer size, the more likely that each of the phrases in a document appears more than once in different contexts.

For example, for a document buffer, where $d_i$ (i=1, ..., n) are documents 1–n, and n is the size of the buffer in terms of document count, then, when a new document $d_n$ is added into the buffer, it is processed using the MSA. When a digram is detected in $d_n$, if the existing digram is a rule, then the new occurrence is marked in $d_n$ with the corresponding non-terminal. If the previous digram is not a rule, a new rule may be introduced and both occurrences of the digram are replaced. Previous occurrences may appear in any document $d_i$ in the buffer. Therefore, as long as a document stays in the buffer, its respective phrases may be identified when a new document contains the same phrase but with a different context enters the buffer.

Documents may be removed from the buffer when it is determined statistically that most of its phrases have been identified. One way to statistically decide if a document can be taken out of the buffer is based on a number of phrases identified over each, say 1K characters. In one embodiment, 1K characters may be selected based on a number of characters in a typical document. However, other number of characters may also be selected.

In still another embodiment, a number of phrases may be measured over an amount of information contained in the documents, to generate a measure of entropy. When the entropy exceeds a pre-determined threshold value that may be based on engineering studies, or the like, then the document may be removed. In still another embodiment, the document may be removed from the buffer based on a duration of time the document has been in the buffer—sort of a first in/first out scheme, or the like. Moreover, in one embodiment, by keeping the digram index across data batches or groups for a given network device, more phrases might be identified earlier during execution.

In any event, at block 610, the buffer may be filled with an initial set of documents. Processing then flows to block 612, where the MSA executes on the documents within the buffer. Flowing to decision block 614, a determination is made whether there are more documents to study to identify phrases. If so, processing then flows to decision block 616, where a determination is made whether to replace one or more documents, using at least one of the mechanisms discussed above. If not, then processing flows to decision block 618; otherwise, if so, then processing flows to block 620.

At block 620, one or more documents may be replaced in the buffer with one or more other documents from the received plurality of documents for the network device. In one embodiment, documents may be added to ensure that the buffer is as full as reasonable. That is, based on a buffer size and how much of the buffer size is unfilled, documents may be added to the buffer to get as close as possible to a full buffer without overflowing the buffer. Processing then loops back to block 612, where the MSA may continue to operate over the documents within the buffer.

If, however, at decision block 614, it is determined that there are no more documents having been received for processing for the given time window then, processing flows to decision block 618. At decision block 618, a determination is made whether the MSA is completed. That is, whether the MSA has examined all of the documents within the buffer and/or received documents for the group of documents. If not, then processing loops back to block 612; otherwise, processing may flow to block 702 within process 700 of FIG. 7.

Continuing to block 702, in one embodiment, the identified phrases from each of the plurality of network devices may be received at one of the network devices. In one embodiment, the phrases may be received within a plurality of indexed arrays of phrases.

Processing then flows to block 704, where a statistical soundness may be determined for the identified phrases to ensure that the terms in the phrases identified are not due to extraneous co-occurrences. One mechanism for assessing the statistical soundness includes using a t-test to eliminate phrases that potentially occur by chance. In one embodiment, the t-test looks at a mean and variance of a sample of measures, where a null hypothesis may be that the sample is drawn from a distribution of mean μ. The test looks at the differences between the observed and the expected means, scaled by the variance of the data to indicate how likely to obtain a sample of that mean and variance of the data assuming that the sample is drawn from a normal distribution with a mean of μ. That is:

$$T=[x-\mu]/\sqrt{[s^2/N]}$$

where x is the sample mean, $s^2$ is the sample variance, N is the sample size, and μ is the mean of the distribution. Then the null hypothesis is that the terms in a phrase are independent. A phrase may be rejected where say there is an x % confidence that the terms occur independently in the phrase.

For example, given "new companies" the evaluation is whether the words "new" and "companies" independently co-occur. In a non-limiting example, then if "new" occurs 15828 times, and "companies" occurs 4675 times, for a total tokens or words of 14,307,668, then $$\text{Probability(new)}=15828/14307668$$

$$\text{Probability(companies)}=4675/14307668$$

Assuming they are independent, then $$P(\text{new companies})=P(\text{new})*P(\text{companies})=3.615\times 10^{-7}$$

Further, $$T=(P(\text{new companies})-P(\text{new})*P(\text{companies}))/\text{sqrt}(P(\text{new companies})/N)=0.9999932$$

This is smaller than 2.576, the probability that "new companies" are not independent which is less 0.005. Thus, using this approach, extraneous co-occurrences of phrases may be removed.

It should be noted however, that while a t-test is disclosed for use in one embodiment, the invention is not so limited. Thus, other testing mechanisms may also be employed, including, for example, z-tests, or other hypothesis testing approaches.

Moving next to block 706, additional phrases might be removed using a part of speech (POS) analysis. For example, in one embodiment, the phrases may be analyzed to identify nouns, pronouns, verbs, and the like. Then based on the analysis, nouns and pronouns might be selectively retained, while verbs, and the like, might be removed. For example, phrases, or words such as "this is," "as is," "would you," or the like, may also be removed.

However, because some words might operate as nouns or pronouns although they might appear otherwise, a dictionary might also be used to ensure that words are not inadvertently removed. For example, the phrase "The Who" (referring to the musical group) might inadvertently be removed by an improper analysis. Thus, phrases are also passed through a dictionary analysis to avoid such inadvertent removals.

Processing further flows to block 708, where weights may be assigned to the remaining phrases based on occurrences in a time window. That is, for each remaining phrase p, that is identified in a current time window, its frequency may be recorded for the current time window, tf(p), and a number of windows that p appears, which may be defined as idf(p). Then a weight may be assigned to p as:

$$tf(p)*\log(N/idf(p))$$

where N is approximately the total number of possible phrases detected. In one embodiment, N may be determined based on an actual number of phrases determined for a current plurality of documents. Flowing next to block 710, the weighting may then be used to rank order the phrases, and select a top n set of candidate phrases.

Continuing next to block 712, trending topic phrases may be selected from this n set of candidate phrases. In one embodiment, time may be partitioned into a plurality of windows of different time sizes, such as an hour, day, week, month, year, or the like, where such times enclose the current time window. Then, a phrase may be determined to be a trending topic if the phrase is determined to appear more frequently in a given window of consideration, than in all of the other enclosing windows. In one embodiment, a frequency may be determined as a:

number of occurrences in a given window/number of seconds in that window

However, other frequency calculations may also be used.

Flowing next to block 714, from the determined trending topic phrases, any redundant phrases or references are removed. Because different phrases can refer to a same event, entity, or the like, these may be removed using any of a variety of mechanisms. For example, in one embodiment, the phrases may be sorted according to their weighted values determined above. Then for each phrase, a search may be performed over the corpus of plurality of documents to extract the terms found in the results of the search. In another embodiment, the search may be performed generally over the network, such as a general web search, or the like, to obtain terms in the search results. Then, phrases may be including or retained in the trending topics were the search results are not covered by the other higher weighted phrases. Other techniques to remove redundant trending topic phrases may also be performed.

In any event, the remaining set of trending topics may then be employed at block 716 to obtain links to one or more of the UGC documents that have content associated with one or more of the trending topic phrases. Moving to block 718, the links and trending topic phrases may be provided for display or otherwise access by one or more client devices. Process 700 then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Example Display of Trending Topic Phrases

Figure 8:
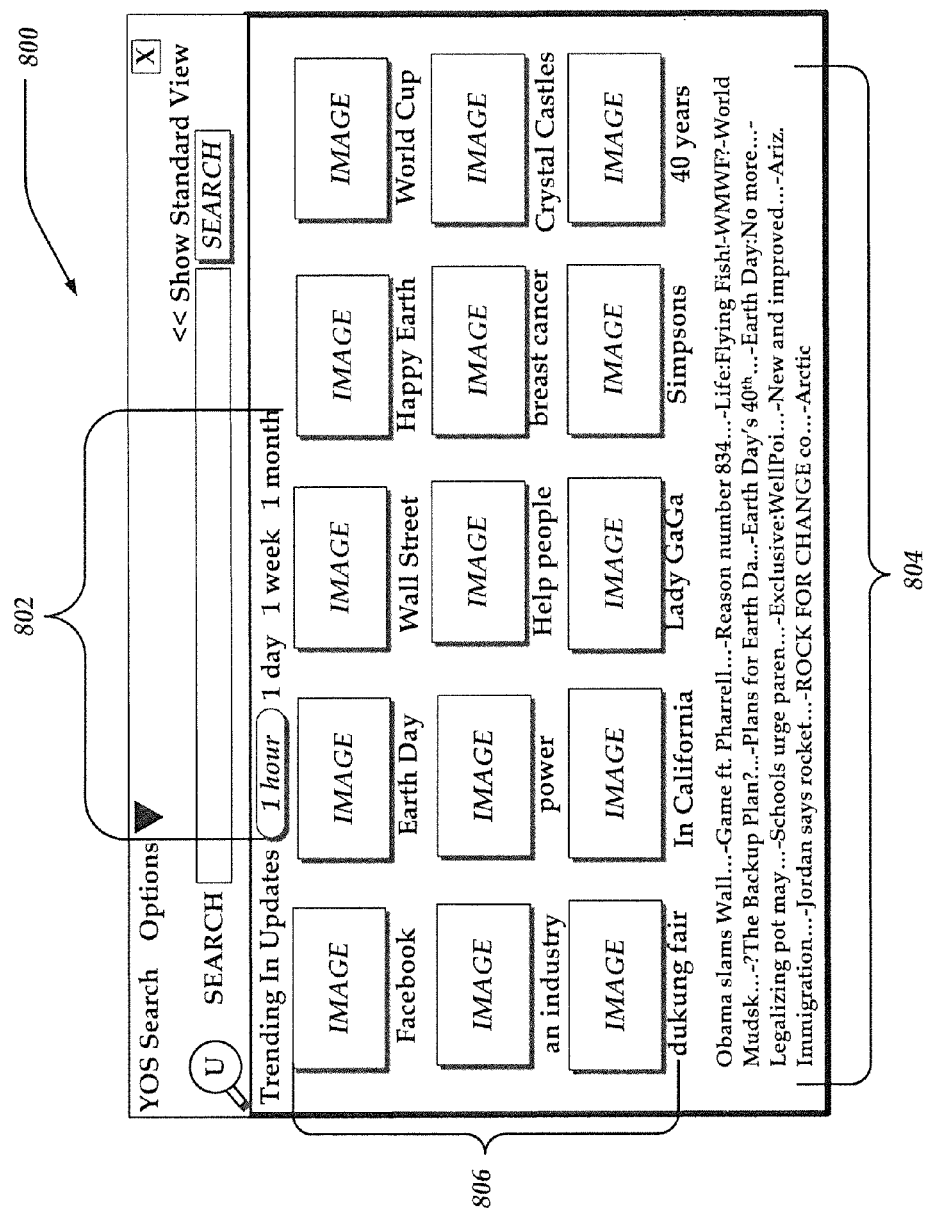
FIG. 8 illustrates one non-limiting, non-exhaustive example screen interface for displaying trending topic phrases and links to UGC documents associated with the trending topics.

FIG. 8 illustrates one non-limiting, non-exhaustive example screen interface for displaying trending topic phrases and/or links to UGC documents associated with the trending topics. It should be recognized that screen interface 800 may include more or less components than shown. However, the components shown are sufficient to disclose an illustrative embodiment for practicing the present invention.

As shown, screen interface 800 shows selectable time windows 802, selectable images 806, and trending topic phrases 804. As shown, a user may select a given time window, such as an hour, day, week, month, or the like, for which to have a related set of trending topics 804 to be displayed. In one embodiment, a user might be able to specify a prior time period, by entering a date and/or time period. Thus, in one embodiment, a user might be able to enter a historical date to determine what the trending topic phrases were for that historical date.

In one embodiment, as illustrated, the trending topics phrases 804 may also be configured as links to one or more UGC documents. Further, images 806 may also provide another interface mechanism to access trending topics. Thus, the invention is not to be construed as being limited to a particular arrangement, layout, or even interface mechanism for displaying trending topic phrases, and/or links to documents associated with a given trending topic phrase.

Moreover, in one embodiment, a user might be sent a message that may include a list of the trending topics for one or more time windows, along with one or more links to documents associated with one or more of the trending topic phrases.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
   a transceiver to send and receive data over a network; and
   a processor that is operative on the received data to perform actions, including:
      receiving, for a given time window, a plurality of documents having User Generated Content (UGC);
      partitioning the received plurality of documents into groups of documents having a determined maximum dissimilarity of content within each group, the dissimilarity being between the documents within a given group;
      distributing the groups of documents across a plurality of other network devices including the network device, wherein each of the other network devices and the network device apply to at least some of the plurality of documents a modified sequitur algorithm to identify a respective plurality of common phrases, wherein the modifications to the modified sequitur algorithm include using an array instead of a doubly-linked list to represent text, marking a diagram using an indexed array to indicate which position in an original sequence of characters is a start or an end of a non-terminal rule, rather than physically replacing the diagram with a non-terminal rule, and encoding frequent phrases or rules as state machines wherein the state machines are used to chain the identified rules for the identified phrases;
      receiving from each of the other network devices the respective plurality of common phrases to obtain identified plurality of common phrases;
      selecting from the identified plurality of common phrases at least one phrase as a trending topic phrase for at least the given time window;
      generating at least one link to at least one of the plurality of documents have content associated with the trending topic phrase; and
      displaying the trending topic phrase and the at least one link.

2. The network device of claim 1, wherein at least one of the network device or the other network devices apply the modified sequitur algorithm using pipelining to the respective received group of documents to identify a respective plurality of common phrases.

3. The network device of claim 1, wherein applying to at least some of the plurality of documents the modified sequitur algorithm further comprises employing a buffering scheme to manage the at least some of the plurality of documents; and wherein a document within the buffer is replaced with another document from the at least some of the plurality of documents based on a statistical analysis of a number of phrases detected.

4. The network device of claim 1, wherein selecting from the identified plurality of common phrases, further comprises:
   removing any phrases from the identified plurality of common phrases that is determined to have an extraneous co-occurrence of terms within the phrase based on a t-test test analysis.

5. The network device of claim 1, wherein selecting from the identified plurality of common phrases, further comprises:
   removing from the identified plurality of common phrases at least one phrase based on a part of speech analysis.

6. The network device of claim 1, wherein selecting from the identified plurality of common phrases, further comprises:
   generating a plurality of time windows of different time durations, wherein the given time window is enclosed by each of the time windows within the plurality of time windows; and
   selecting a phrase as a trending topic phrase if the phrase appears more frequently in the given time window than in each of the plurality of time windows.

7. A system, comprising:
   a computer-readable storage device configured to receive a plurality of documents received in a continuous stream; and
   a plurality of network devices, at least one of the plurality of network devices is configured to receive the plurality of documents and to partition the documents for distribution to each of the other network devices based on maximizing a determined dissimilarity of content for documents distributed to each given network device, the dissimilarity being between the documents within a given network device, each network device operable to receive at least some of the plurality of documents, and to perform actions, comprising:
   applying to at least some of the plurality of documents a modified sequitur algorithm to identify a plurality of common phrases, wherein modifications to the modified sequitur algorithm include using an array instead of a doubly-linked list to represent text, marking a diagram using an indexed array to indicate which position in an original sequence of characters is a start or an end of a non-terminal rule, rather than physically replacing the diagram with a non-terminal rule, and encoding frequent phrases or rules as state machines wherein the state machines are used to chain the identified rules for the identified phrases;

selecting from the identified plurality of common phrases at least one phrase as a trending topic phrase for at least a given time window;

generating at least one link to at least one of the plurality of documents have content associated with the trending topic phrase; and displaying the trending topic phrase and the at least one link.

8. The system of claim 7, wherein at least one of the plurality of network devices is configured to perform the modified sequitur algorithm using pipelining.

9. The system of claim 7, wherein applying to at least some of the plurality of documents the modified sequitur algorithm further comprises employing a buffering scheme to manage the at least some of the plurality of documents; and wherein a document within the buffer is replaced with another document from the at least some of the plurality of documents based on a statistical analysis of a number of phrases detected.

10. The system of claim 7, wherein selecting from the identified plurality of common phrases, further comprises:
removing any phrases from the identified plurality of common phrases that is determined to have an extraneous co-occurrence of terms within the phrase based on a t-test test analysis.

11. The system of claim 7, wherein selecting from the identified plurality of common phrases, further comprises:
removing from the identified plurality of common phrases at least one phrase based on a part of speech analysis.

12. The system of claim 7, wherein selecting from the identified plurality of common phrases, further comprises:
generating a plurality of time windows of different time durations, wherein the given time window is enclosed by each of the time windows within the plurality of time windows; and
selecting a phrase as a trending topic phrase if the phrase appears more frequently in the given time window than in each of the plurality of time windows.

13. A non-transitory computer-readable storage medium having computer-executable instructions, the computer-executable instructions when installed onto a computing device enable the computing device to perform actions, comprising:
receiving a plurality of documents within a given time window from a stream of documents;
partitioning the received plurality of documents into groups of documents having a determined maximum dissimilarity of content within each group, the dissimilarity being between the documents within a given group;
distributing the groups of documents across a plurality of other network devices including the network device, wherein each of the other network devices and the network device apply to the plurality of documents a modified sequitur algorithm to identify a respective plurality of common phrases, wherein modifications to the modified sequitur algorithm include using an array instead of a doubly-linked list to represent text, marking a diagram using an indexed array to indicate which position in an original sequence of characters is a start or an end of a non-terminal rule, rather than physically replacing the diagram with a non-terminal rule, and encoding frequent phrases or rules as state machines wherein the state machines are used to chain the identified rules for the identified phrases;

receiving from each of the other network devices the respective plurality of common phrases to obtain identified plurality of common phrases;

selecting from the identified plurality of common phrases a plurality of phrases as trending topic phrases for at least the given time window;

generating at least one link to at least one of the plurality of documents have content associated with one of the trending topic phrases; and displaying the trending topic phrases and the at least one link.

14. The non-transitory computer-readable storage medium of claim 13, wherein applying to the plurality of documents the modified sequitur algorithm further comprises employing a buffering scheme to manage the plurality of documents; and wherein a document within the buffer is replaced with another document from the plurality of documents based on a statistical analysis of a number of phrases detected.

15. The non-transitory computer-readable storage medium of claim 13, wherein selecting from the identified plurality of common phrases, further comprises:
removing any phrases from the identified plurality of common phrases that is determined to have an extraneous co-occurrence of terms within the phrase based on a t-test test analysis.

16. The non-transitory computer-readable storage medium of claim 13, wherein selecting from the identified plurality of common phrases, further comprises:
removing from the identified plurality of common phrases at least one phrase based on a part of speech analysis.

17. The non-transitory computer-readable storage medium of claim 13, wherein selecting from the identified plurality of common phrases, further comprises:
generating a plurality of time windows of different time durations, wherein the given time window is enclosed by each of the time windows within the plurality of time windows; and
selecting a phrase as a trending topic phrase if the phrase appears more frequently in the given time window than in each of the plurality of time windows.

18. The non-transitory computer-readable storage medium of claim 13, wherein the computer-executable instructions perform actions, further comprising:
sorting each of the trending topic phrases based on a weighting scheme;
for each phrase in the trending topic phrases, performing a search;
extracting search result terms from a result of each search; and
deleting from the trending topic phrases, any phrase having a search result term in a corresponding search result that corresponds to at least one other search result term associated with a higher weighted trending topic phrase.

19. The non-transitory computer-readable storage medium of claim 13, wherein the plurality of documents include user generated content and non-user generated content.

* * * * *